United States Patent
Nanjundan et al.

(10) Patent No.: US 6,768,974 B1
(45) Date of Patent: Jul. 27, 2004

(54) METHOD FOR DETERMINING A MODEL FOR A WELDING SIMULATION AND MODEL THEREOF

(75) Inventors: Ashok Nanjundan, Savoy, IL (US); Pingsha Dong, Dublin, OH (US); Jinmiao Zhang, Dublin, OH (US); Frederick W. Brust, Columbus, OH (US); Yi Dong, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 666 days.

(21) Appl. No.: 09/685,909

(22) Filed: Oct. 10, 2000

Related U.S. Application Data

(60) Provisional application No. 60/165,205, filed on Nov. 12, 1999.

(51) Int. Cl.[7] .............................................. G05B 19/18
(52) U.S. Cl. ........................... 703/7; 703/5; 219/137 R; 228/101; 228/103
(58) Field of Search ..................... 703/6, 7, 5; 228/103, 228/101; 219/137 R, 110

(56) References Cited

U.S. PATENT DOCUMENTS

| | | | |
|---|---|---|---|
| 4,596,917 A | * | 6/1986 | Nied et al. .................. 228/103 |
| 4,998,663 A | * | 3/1991 | Cakmak et al. .......... 219/117.1 |
| 5,552,575 A | * | 9/1996 | Doumanidis ............ 219/137 R |

FOREIGN PATENT DOCUMENTS

| | | | | |
|---|---|---|---|---|
| JP | 406186141 A | * | 7/1994 | .................. 73/850 |

OTHER PUBLICATIONS

Harold Chestnut, Systems Engineering Tools, 1965, John Wiley & Sons, pp. 108–109.*
A Constitutive Model for Welding Process Simulation Using Finite . . . Brust, et al., Battelle Memorial Institute.
A Model for Predicting Residual Stresses In Metal Cutting, Nagoya, 1990.
Applied Mechanics in grinding. VI. Residual stresses and surface hardening b coupled thermo–. . . , Nerac, Inc, 1999.

* cited by examiner

Primary Examiner—Albert W. Paladini
(74) Attorney, Agent, or Firm—Steve D. Lundquist; Robin S. Fahlberg

(57) ABSTRACT

A method for determining a model for a welding simulation, and the associated model. The method includes the steps of determining a history annihilation model of a material being welded, determining a strain hardening model of the material being welded, determining a three-dimensional virtual elements detection model of the material being welded, and incorporating the above models into a constitutive model for the welding simulation.

32 Claims, 4 Drawing Sheets

METHOD FOR DETERMINING A MODEL FOR A WELDING SIMULATION AND MODEL THEREOF

This application claims the benefit of prior provisional patent application Serial No. 60/165,205 filed Nov. 12, 1999.

TECHNICAL FIELD

This invention relates generally to a method for determining a model for a welding simulation and, more particularly, to a method for incorporating models of aspects of the welding simulation into a constitutive model, and a model thereof.

BACKGROUND ART

During a welding process, residual stresses and distortions are introduced into materials being welded as a result of the high temperatures involved with welding. These stresses and distortions may alter characteristics of the welded material in an adverse manner. For example, the structural integrity of the material may be compromised.

It is often desired to have the capability to predict the stresses and distortions associated with the welding process. This information may then be used to modify the welding process to minimize stresses and distortions during subsequent welds. A well known method to predict stresses and distortions is to simulate the welding process in a model. For example, it is common to use finite element analysis to model the welding process, and several commercial software packages are available.

However, a significant disadvantage of known welding process model packages is that they cannot adequately model some of the unique phenomena associated with welding. For example, these packages cannot account for history annihilation caused by melting/remelting as different weld passes are deposited. The inability of the known model packages to account for unique welding phenomena results in inaccurate computations. Therefore, it is desired to model the welding process by including unique phenomena, such as history annihilation, phase transformation, strain hardening, and the like. It is also desired to model the welding process in a method that is efficient and saves computational time and power; for example, by determining various models of the phenomena associated with the welding process, and incorporating these models into a constitutive model of the overall process.

In addition, many of the same unique phenomena are introduced during a thermal cutting process, such as cutting by means of oxyfuel, plasma, or laser. The models used for a welding process may also be used for a thermal cutting process.

The present invention is directed to overcoming one or more of the problems as set forth above.

DISCLOSURE OF THE INVENTION

In one aspect of the present invention a method for determining a model for a welding simulation is disclosed. The method includes the steps of determining a history annihilation model of a material being welded, determining a strain hardening model of the material being welded, determining a three-dimensional virtual elements detection model of the material being welded, and incorporating the above models into a constitutive model for the welding simulation.

In another aspect of the present invention a method for determining a model for a welding simulation is disclosed. The method includes the steps of determining a history annihilation model of a material being welded, determining a phase transformation model of the material being welded, determining a three-dimensional virtual elements detection model of the material being welded, and incorporating the above models into a constitutive model for the welding simulation.

In another aspect of the present invention a method for determining a model for a welding simulation is disclosed. The method includes the steps of determining a history annihilation model of a material being welded, determining a strain hardening model of the material being welded, determining a phase transformation model of the material being welded, determining a large deformation model of the material being welded, determining a three-dimensional virtual elements detection model of the material being welded, and incorporating the above models into a constitutive model for the welding simulation.

In another aspect of the present invention a constitutive model for a welding simulation is disclosed. The model includes a history annihilation model of a material being welded, a strain hardening model of the material being welded, a three-dimensional virtual elements detection model of the material being welded, and means for incorporating the above models into a constitutive model for the welding simulation.

In another aspect of the present invention a constitutive model for a welding simulation is disclosed. The model includes a history annihilation model of a material being welded, a phase transformation model of the material being welded, a three-dimensional virtual elements detection model of the material being welded, and means for incorporating the above models into a constitutive model for the welding simulation.

In another aspect of the present invention a constitutive model for a welding simulation is disclosed. The model includes a history annihilation model of a material being welded, a strain hardening model of the material being welded, a phase transformation model of the material being welded, a large deformation model of the material being welded, a three-dimensional virtual elements detection model of the material being welded, and means for incorporating the above models into a constitutive model for the welding simulation.

BEST MODE FOR CARRYING OUT THE INVENTION

Figure 1:
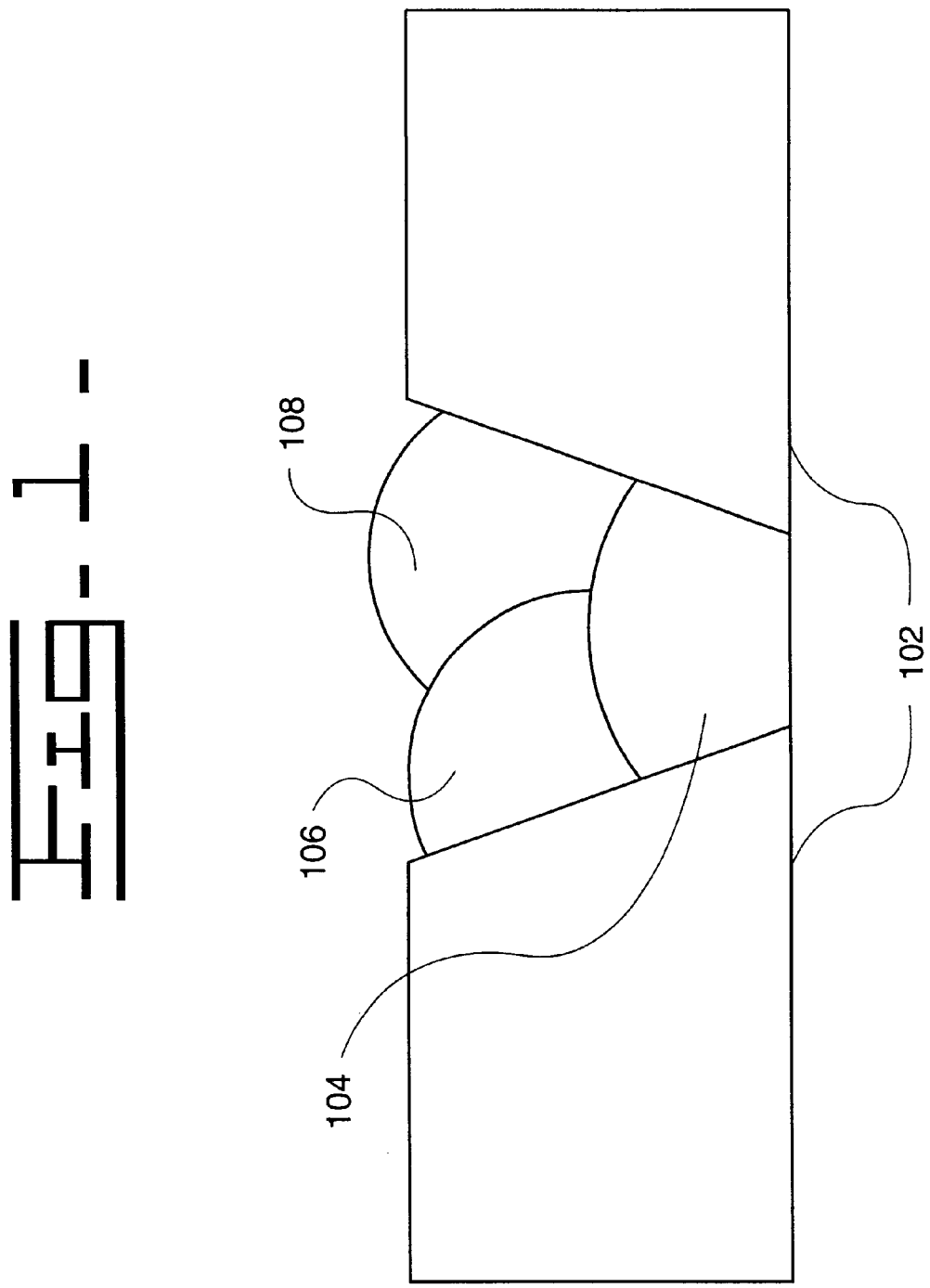
FIG. 1 is a diagrammatic illustration of two pieces of material welded by multiple weld passes.
Figure 2:
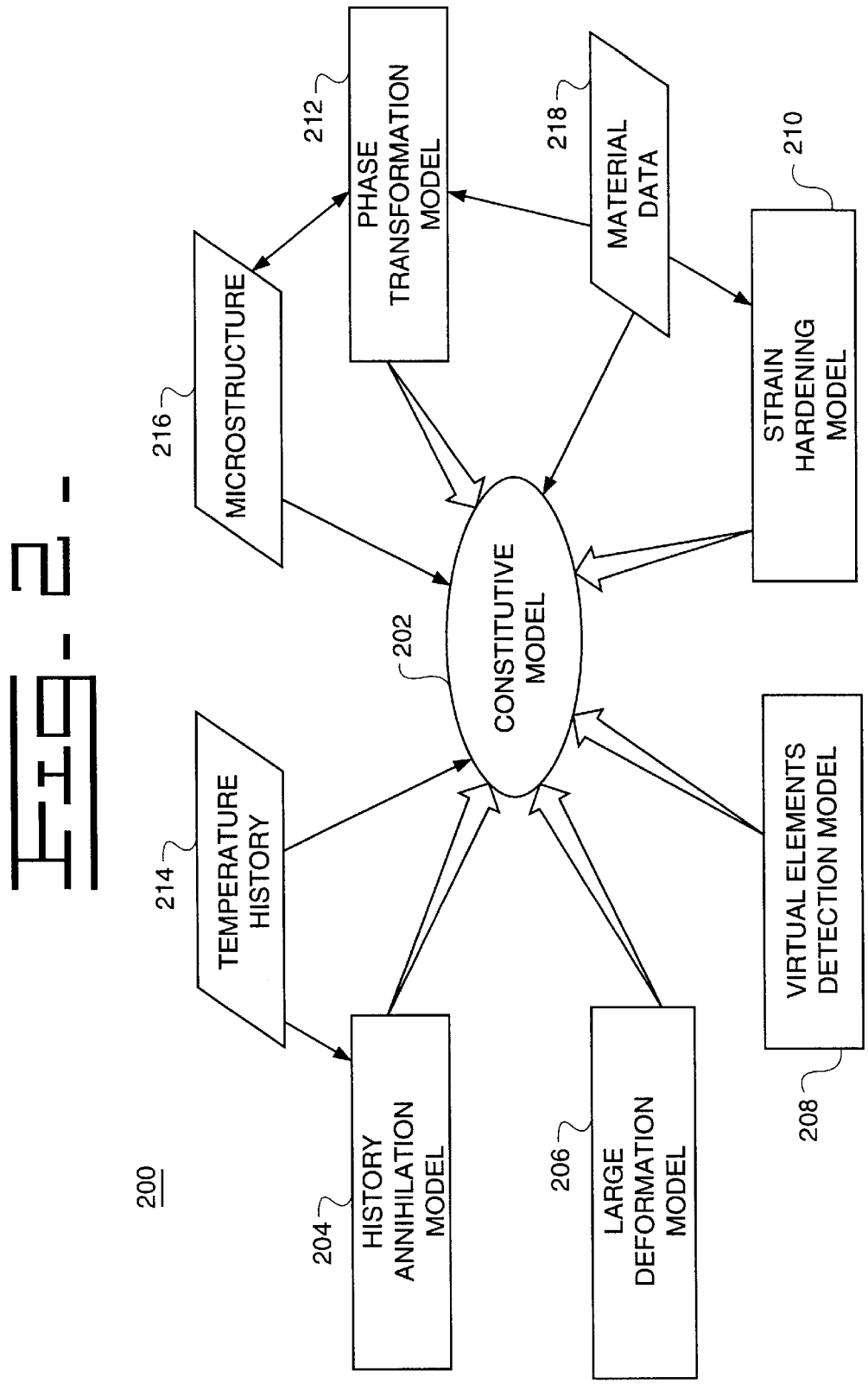
FIG. 2 is a block diagram illustrating a preferred embodiment of a constitutive welding simulation model.

With reference to the drawings, and with particular reference to FIGS. 1 and 2, a preferred embodiment of a model 200 of a welding process is disclosed.

In FIG. 1, a diagrammatic illustration of two pieces of material 102 being welded by multiple weld passes 104, 106,108 is shown. The two pieces of material 102 are shown being welded in a standard butt joint weld, as is well known in the art. However, other types of weld joints, e.g., lap joints, t-fillet joints, and the like, may also be used with reference to the present invention.

It is common to use multiple passes during a weld process to achieve greater strength and structural integrity of the completed weld. For example, FIG. 1 indicates three weld passes 104,106,108. It is not unusual for a weld process to employ many weld passes, for example, 20 passes. However, the use of multiple weld passes introduces stresses and distortions that are difficult to determine and model. For example, the melting and remelting of the materials during subsequent passes introduces characteristics of the material that are difficult to model. In addition, the cyclic heating and cooling of the material creates additional stresses.

Referring to FIG. 2, a model 200 of the weld process is shown, which is based on a constitutive model 202. Constitutive models, e.g., for welding process simulation, are well known in the art and have been used for many years. A constitutive model is a model based on a compilation of physical laws associated with the phenomenon desired to be modeled.

A history annihilation model 204 models melting/remelting of the material during the weld process. In addition, annealing of the material during cyclic melting/remelting of the material during multiple weld passes is modeled. As the material melts, the deformation history, i.e., the stresses and deformations, of the material is eliminated, and the material is restored to a virgin state. Therefore, for accurate modeling of the welding process, stresses and distortions must be reset in response to the occurrence of a melting/remelting condition.

A large deformation model 206 is used to model thermal and mechanical strain increments of the material being welded. More specifically, the large deformation model 206 models the distinguishing characteristics between plastic and elastic annealing strains during the welding process.

A virtual elements detection model 208 provides virtual elements for weld passes which have not actually occurred. In a multiple pass welding process, models must include all passes before any weld metal is actually deposited. For example, the stiffness of the material must be modeled as though all weld passes have been completed, even though welding has not begun. Typical welding model packages compensate for this by a process known as element birth and death. The finite elements of the weld metal must be deactivated until later in the modeling process. This method is very tedious and requires much time and computational power to perform, since the elements must be removed from the files and restored later. The virtual elements detection model 208 overcomes this by assuming that the weld metal has been deposited at a minimal stiffness. As the subsequent weld passes are performed, the metal stiffness from each pass is modified to more closely reflect the actual stiffness created by the welding process. In the preferred embodiment, the virtual elements detection model 208 is a three-dimensional model to provide modeling not only of the portion of the material being welded, but to also provide modeling of portions of the material to be welded as the overall weld process takes place.

A strain hardening model 210 models the yield strength which increases as a result of the thermal cycles associated with the multiple weld passes. Yield strength increases as the stresses and strains of welding move from a zero state to a yield state, i.e., from before heating the material to a point just prior to the material yielding to the application of the heat. The strain hardening model 210 is adapted to perform a series of iterations to determine the increments of plastic strain of the material.

A phase transformation model 212 models changes in the microstructure of the material during the welding process. The changes in the microstructure of the material are a function of parameters such as the chemical composition of the material, conditions of the welding process, and the like. Changes in the material include, but are not limited to, volumetric changes during the phase transformation, transformation plasticity, and yield hysteresis due to phase differences in the heating and cooling processes.

A temperature history database 214 stores and provides a temperature history of the material during the welding process. Preferably, the temperature history database 214 provides temperature history data to the constitutive model 202 and the history annihilation model 204.

A microstructure database 216 stores and provides data of the microstructure of the material during the welding process. Preferably, the microstructure database 216 provides microstructure data to the constitutive model 202 and the phase transformation model 212. In addition, the microstructure database 216 may receive microstructure data of the material from the phase transformation model 212.

A material data database 218 stores and provides data of the material, e.g., stresses and strains of the material, during the welding process. Preferably, the material data database provides data to the constitutive model 202, the strain hardening model 210, and the phase transformation model 212.

Figure 3:
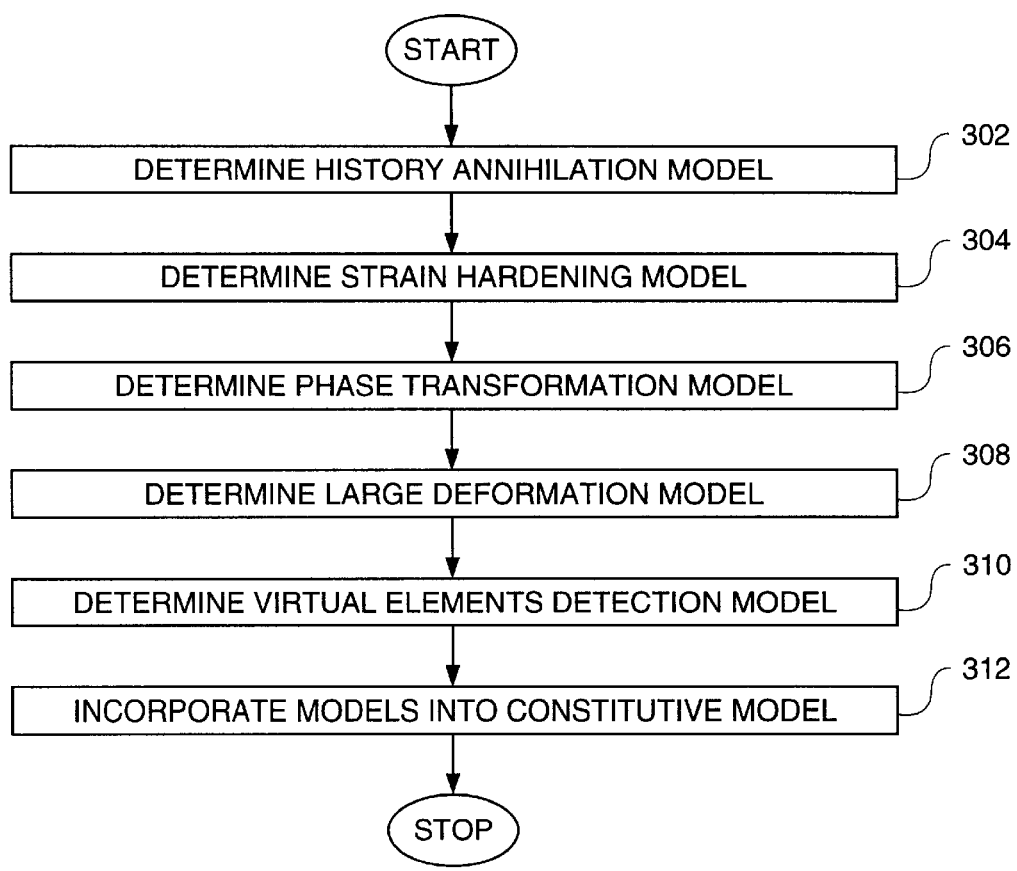
FIG. 3 is a flow diagram illustrating a preferred method of the present invention.

Referring to FIG. 3, a flow diagram illustrating a preferred method of the present invention is shown.

In a first control block 302, the history annihilation model 204 determines the history of the material as a function of melting/remelting and annealing during the welding process. In a second control block 304, the strain hardening model 210 determines the yield strength of the material as a function of multiple heating and cooling cycles caused by multiple weld passes. In a third control block 306, the phase transformation model 212 determines microstructure changes of the material caused by heating of the material during the welding process.

Control proceeds to a fourth control block 308, in which the large deformation model.206 determines the distinguishing characteristics between plastic and elastic annealing strains during the welding process. In a fifth control block 310, the virtual elements detection model 208 determines initial minimal stiffness of the weld passes in three dimensions of the material prior to the welding process being performed. In a sixth control block 312, the above models are incorporated into the constitutive model 202 to determine a complete model of the welding process.

Figure 4:
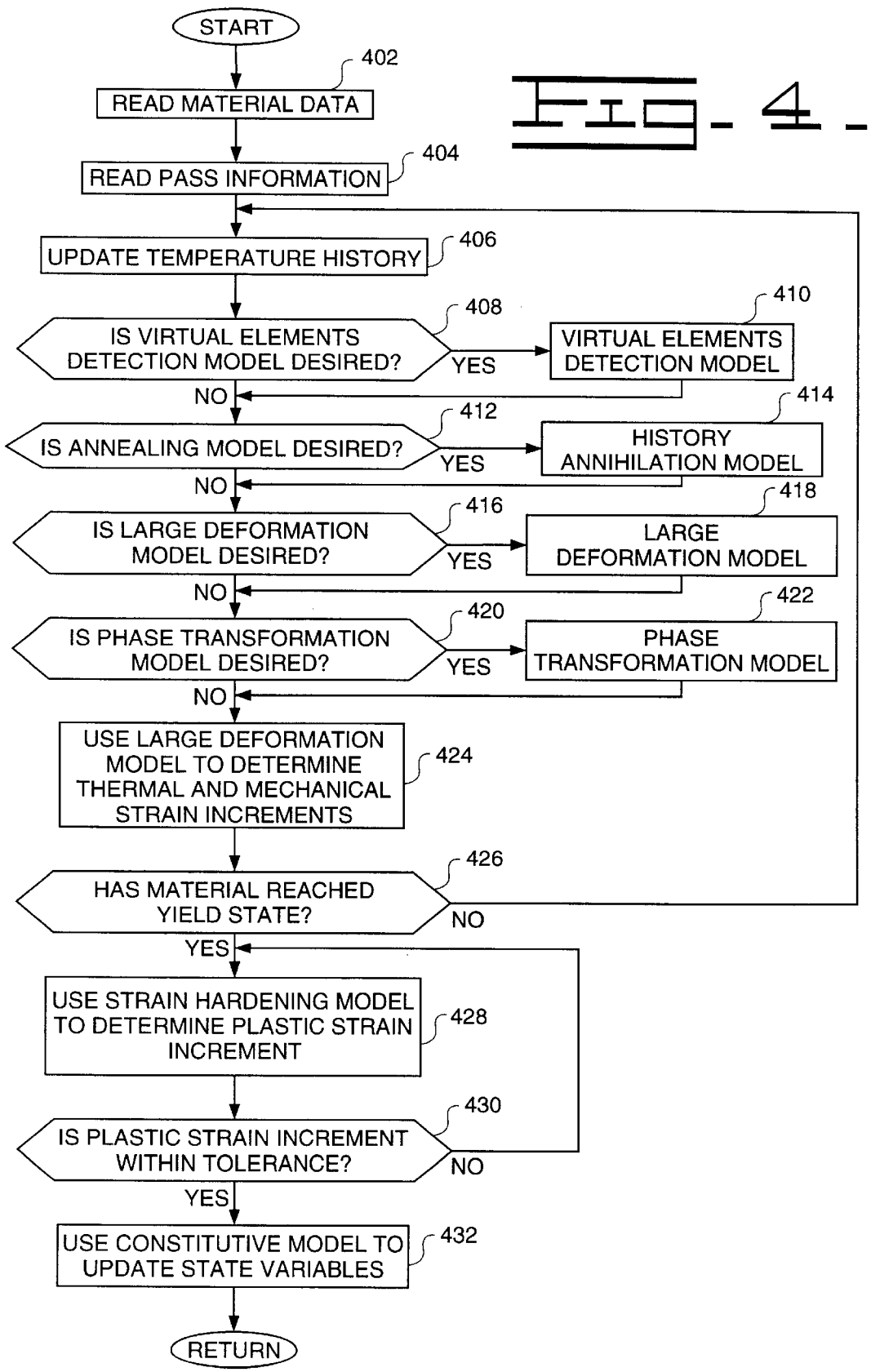
FIG. 4 is a flow diagram illustrating a preferred embodiment of the method of FIG. 3.

Referring to FIG. 4, a flow diagram illustrating a preferred embodiment of the method of FIG. 3 is shown. It is noted that the steps embodied in the flow diagram of FIG. 4 are illustrative of exemplary processes. Alternative and additional steps may be employed where desired without deviating from the spirit of the present invention.

In a first control block 402, material data is read from the material data database 218. In a second control block 404, information relevant to the weld pass being performed is read from one of the temperature history database 214, the microstructure database 216, and the material data database 218. In a third control block 406, the temperature history of the material being welded is updated in the temperature history database 214.

In a first decision block 408, it is determined if the virtual elements detection model 208 is desired in the overall model. If yes, then the virtual elements detection model 208 is enabled in a fourth control block 410.

In a second decision block 412, it is determined if an annealing model is desired. If yes, then the history annihilation model 204 is enabled in a fifth control block 414.

In a third decision block 416, it is determined if the large deformation model 206 is desired. If yes, then the large deformation model 206 is enabled in a sixth control block 418.

In a fourth decision block 420, it is determined if the phase transformation model 212 is desired. If yes, then the phase transformation model 212 is enabled in a seventh control block 422.

Control then proceeds to an eighth control block 424. In the eighth control block 424, the large deformation model 206 is used to determine thermal and mechanical strain increments of the material being welded. In the preferred embodiment, the thermal and mechanical strain increments are determined by use of solution dependant state variables of accumulated elastic and plastic strain increments. For example, $$\Delta\epsilon_{ij}^{m} = \Delta\epsilon_{ij}^{e} + \Delta\epsilon_{ij}^{p} \qquad \text{(Equation 1)}$$

where $\Delta\epsilon_{ij}^{m}$ is the thermal and mechanical strain increment, $\Delta\epsilon_{ij}^{e}$ is the elastic strain increment, and $\Delta\epsilon_{ij}^{p}$ is the plastic strain increment.

In a fifth decision block 426, it is determined if the material has reached the yield state. If no, then control returns to the third control block 406 for continued modeling. If yes, then control proceeds to a ninth control block 428. In the ninth control block 428, the strain hardening model 210 is used to determine the plastic strain increment, i.e., the incremental increase in yield strength of the material.

In a sixth decision block 430, the plastic strain increment is monitored, and the strain hardening model 210 is used to determine further increments of the plastic strain until a desired tolerance level is reached. Once the plastic strain increment is determined to be within tolerance, control proceeds to a tenth control block 432, in which the constitutive model 202 is used to update the state variables of each incremental modeled parameter, and to provide a complete model 200 of the welding process. In the preferred embodiment, the constitutive model 202 uses a state variable approach. For example, for each incremental value determined, the total of the stresses and strains may be determined as:

$$\Delta\epsilon_{ij}^{Tot} = \Delta\epsilon_{ij}^{e} + \Delta\epsilon_{ij}^{p} + \Delta\epsilon_{ij}^{T} + \Delta\epsilon_{ij}^{A} + \Delta\epsilon_{ij}^{Tr} \qquad \text{(Equation 2)}$$

where $\Delta\epsilon_{ij}^{Tot}$, $\Delta\epsilon_{ij}^{e}$, $\Delta\epsilon_{ij}^{p}$, $\Delta\epsilon_{ij}^{T}$, $\Delta\epsilon_{ij}^{A}$, $\Delta\epsilon_{ij}^{Tr}$ are the total, elastic, plastic, thermal, annealing, and phase transformation incremental strains, respectively. As the state variable solutions for each increment are found, the overall solution dependant state variables are updated accordingly.

It is noted that many of the same unique phenomena are introduced during a thermal cutting process, such as cutting by means of oxyfuel, plasma, or laser. The models described above for a welding process may also be used for analysis of a thermal cutting process without deviating from the spirit of the present invention.

Industrial Applicability

The present invention provides an enhanced and more accurate model of the stresses and distortions which occur during a welding process, as compared to typical welding process models currently known. The characteristics of the materials being welded are modeled as temperatures approach levels which cause changes in the material properties. Examples of welding related material behaviors which are modeled include, but are not limited to, melting/remelting caused by multiple weld passes, material history annihilation caused by annealing, thermal cycling, i.e., alternate heating and cooling of the material, phase transformations, and the like. The results of the above modeling are incorporated into a constitutive weld model to provide a complete model of the effects of the weld process. This complete model may then be used to minimize adverse effects caused by welding.

Other aspects, objects, and features of the present invention can be obtained from a study of the drawings, the disclosure, and the appended claims.

What is claimed is:

1. A method for determining a model for a welding simulation, including the steps of:

determining a history annihilation model of a material being welded;

determining a strain hardening model of the material being welded;

determining a three-dimensional virtual elements detection model of the material being welded; and incorporating the above models into a constitutive model for the welding simulation.

2. A method, as set forth in claim 1, further including the steps of:

determining a phase transformation model of the material being welded; and incorporating the phase transformation model into the constitutive model.

3. A method, as set forth in claim 2, wherein determining a phase transformation model includes the step of modeling changes in microstructure of the material being welded.

4. A method, as set forth in claim 1, further including the steps of:

determining a large deformation model of the material being welded; and incorporating the large deformation model into the constitutive model.

5. A method, as set forth in claim 4, wherein determining a large deformation model includes the step of modeling a set of characteristics between conditions of plastic and elastic annealing strains of the material being welded.

6. A method, as set forth in claim 1, further including the steps of:

determining a phase transformation model of the material being welded;

determining a large deformation model of the material being welded; and incorporating the above models into the constitutive model.

7. A method, as set forth in claim 6, further including the steps of:

storing a temperature history of the material being welded; and providing the temperature history to at least one of the above models.

8. A method, as set forth in claim 6, further including the steps of:

storing data relevant to the material being welded; and providing the data to at least one of the above models.

9. A method, as set forth in claim 8, wherein the data includes microstructure data of the material being welded.

10. A method, as set forth in claim 8, wherein the data includes stress and strain data of the material being welded.

11. A method, as set forth in claim 1, wherein determining a history annihilation model includes at least one of the steps of:

modeling melting/remelting of the material being welded; and modeling annealing of the material being welded.

12. A method, as set forth in claim 1, wherein determining a strain hardening model includes the step of modeling a yield strength of the material being welded.

13. A method, as set forth in claim 1, wherein determining a three-dimensional virtual elements detection model includes the step of assuming a predetermined minimal stiffness value for each of a plurality of future weld passes.

14. A method for determining a model for a welding simulation, including the steps of:

determining a history annihilation model of a material being welded;

determining a phase transformation model of the material being welded;

determining a three-dimensional virtual elements detection model of the material being welded; and incorporating the above models into a constitutive model for the welding simulation.

15. A method, as set forth in claim 14, further including the steps of:

determining a strain hardening model of the material being welded; and incorporating the strain hardening model into the constitutive model.

16. A method, as set forth in claim 14, further including the steps of:

determining a large deformation model of the material being welded; and incorporating the large deformation model into the constitutive model.

17. A method, as set forth in claim 14, further including the steps of:

determining a strain hardening model of the material being welded;

determining a large deformation model of the material being welded; and incorporating the above models into the constitutive model.

18. A method for determining a model for a welding simulation, including the steps of:

determining a history annihilation model of a material being welded;

determining a strain hardening model of the material being welded;

determining a phase transformation model of the material being welded;

determining a large deformation model of the material being welded;

determining a three-dimensional virtual elements detection model of the material being welded; and incorporating the above models into a constitutive model for the welding simulation.

19. A constitutive model for a welding simulation, comprising:

a history annihilation model of a material being welded;

a strain hardening model of the material being welded;

a three-dimensional virtual elements detection model of the material being welded; and means for incorporating the above models into a constitutive model for the welding simulation.

20. A model, as set forth in claim 19, further including:

a phase transformation model of the material being welded; and means for incorporating the phase transformation model into the constitutive model.

21. A model, as set forth in claim 20, wherein the phase transformation model is adapted to model changes in microstructure of the material being welded.

22. A model, as set forth in claim 19, further including:

a large deformation model of the material being welded; and means for incorporating the large deformation model into the constitutive model.

23. A model, as set forth in claim 22, wherein the large deformation model is adapted to model a set of characteristics between conditions of plastic and elastic annealing strains of the material being welded.

24. A model, as set forth in claim 19, further including:

a phase transformation model of the material being welded;

a large deformation model of the material being welded; and means for incorporating the above models into the constitutive model.

25. A model, as set forth in claim 19, wherein the history annihilation model is adapted to model at least one of:

melting/remelting of the material being welded; and annealing of the material being welded.

26. A model, as set forth in claim 19, wherein the strain hardening model is adapted to model a yield strength of the material being welded.

27. A model, as set forth in claim 19, wherein the three-dimensional virtual elements detection model is adapted to model a predetermined minimal stiffness value for each of a plurality of future weld passes.

28. A constitutive model for a welding simulation, comprising:

a history annihilation model of a material being welded;

a phase transformation model of the material being welded;

a three-dimensional virtual elements detection model of the material being welded; and means for incorporating the above models into a constitutive model for the welding simulation.

29. A model, as set forth in claim 28, further including:

a strain hardening model of the material being welded; and means for incorporating the strain hardening model into the constitutive model.

30. A model, as set forth in claim 28, further including:

a large deformation model of the material being welded; and means for incorporating the large deformation model into the constitutive model.

31. A model, as set forth in claim 28, further including:

a strain hardening model of the material being welded;

a large deformation model of the material being welded; and means for incorporating the above models into the constitutive model.

32. A constitutive model for a welding simulation, comprising:

a history annihilation model of a material being welded;

a strain hardening model of the material being welded;

a phase transformation model of the material being welded;

a large deformation model of the material being welded;

a three-dimensional virtual elements detection model of the material being welded; and means for incorporating the above models into a constitutive model for the welding simulation.

* * * * *